Patented Dec. 12, 1944

2,364,760

UNITED STATES PATENT OFFICE 2,364,760

THERAPEUTIC PREPARATION EFFECTIVE AGAINST ULCERS

David J. Sandweiss, Detroit, Mich., assignor to Parke, Davis & Company, Detroit, Mich., a corporation of Michigan No Drawing. Application February 29, 1940, Serial No. 321,407

1 Claim. (Cl. 167—74)

The invention relates to products useful in the treatment of gastroenteric ulcers or inhibiting the formation of such ulcers. The invention relates more particularly to products obtainable from urines.

I have found that an active substance can be separated from animal or human urines of either the male or female species which has the valuable property of exercising a beneficial effect on gastroenteric ulcers such as peptic or duodenal ulcers. My products are characterized by the fact that they do not possess activity of the so-called anterior pituitary-like hormone, and are not toxic when administered to humans.

In obtaining the new products, one may proceed in various ways to treat the urine so as to separate out the active portion. Thus, the new active principle of the invention can be separated from the urine by methods of precipitation with organic solvents, salting out methods, or by extraction methods. The invention will be illustrated by the following examples.

Example 1

A quantity of 10 liters of male human urine is acidified to a pH of about 4.5 by the addition of acetic acid. If the urine is not clear, it may be centrifuged at this point. 500 cc. of acetone saturated with benzoic acid are then added and the urine allowed to stand for a few hours. At the end of this time benzoic acid carrying the desired fraction with it has separated out and is filtered off. The precipitate is taken up in ½ liter of acetone. A small amount of insoluble material remains undissolved in the acetone and is the fraction effective in treating ulcer. This fraction is separated from the supernatant liquid and centrifuged if necessary. It may also be washed with acetone. If desired, the adsorption on benzoic acid and separation of activity from the adsorbate can be repeated one or more times. Upon drying, taking up the product in water, filtering from any undissolved material and evaporating to dryness, the product is obtained as a dry amorphous powder which is soluble in water, insoluble in aqueous acetone containing about 50-60% by volume of acetone, insoluble in most organic solvents, especially undiluted neutral organic solvents. Its aqueous solutions do not reduce Fehling's solution. Its aqueous solutions are still active after heating under conditions which destroy the anterior pituitary-like sex hormone. The product of this example does not show any gonadotropic activity when assayed by the usual method of injection into immature female mice. The product also has no estrogenic activity such as that possessed by ovarian hormones, since it does not initiate an estrual cycle in ovariectomized animals.

Example 2

200 liters of male human urine are concentrated to about one-tenth the original volume at a low temperature and preferably in vacuo. A concentrate is thereby obtained which is treated with 60 liters of ethyl alcohol to throw out a precipitate which is filtered off after the mixture has been allowed to stand for some time. The precipitate is then taken up in a quantity of water approximately 5 times as great as the precipitate and filtered from any insoluble matter. The filtrate is treated with a volume of ethyl alcohol equal to the filtrate itself. The addition of the alcohol produces a precipitate which is filtered off, the substance active in treating ulcers being in the filtrate. This filtrate can be concentrated and dried to give a product substantially equivalent to that obtained by Example 1 above.

Example 3

500 liters of fresh urine from normal non-pregnant women are evaporated in vacuo to about 45 liters, 200 liters of acetone added and the precipitate which forms is filtered off. The crude precipitate is dissolved in 5 times its quantity of water, any insoluble matter centrifuged off and the filtrate treated with an equal volume of ethyl alcohol. The precipitate which forms upon adding alcohol is filtered off to obtain a filtrate containing the factor effective in treating or preventing ulcer. The physical, chemical and physiological properties of the product of this example are substantially those possessed by the products of Examples 1 and 2, which were obtained from male urine.

Example 4

To 1000 liters of the urine of pregnant women are added 2000 liters of alcohol. The precipitate which forms is filtered off and 2000 liters of an organic water immiscible liquid, such as ethyl ether or chloroform or other chlorinated hydrocarbon solvent, are added to the filtrate. A further precipitate is produced and is filtered off. The precipitate thus obtained is taken up in water and the principles effective in treating ulcer separated from any fraction having anterior pituitary-like activity by methods of fractionation such as isoelectric precipitation or salting out. Various other methods of effecting the separation of the ulcer preventing factor from anterior pituitary-like hormone can be used. For example, the precipitate obtained by the addition of ether as described above can be dried, taken up in aqueous solution and the aqueous solution heated to destroy anterior pituitary-like hormones, inasmuch as the ulcer factor is still present after such heat treatment. The heat treated product is then ready for use in aqueous solution or, after evaporating off the solvent, in the dry form.

Example 5

100 liters of non-pregnant mare's urine are saturated with a salt such as sodium chloride or ammonium sulfate and the insoluble matter thereby produced is collected by centrifugation. The precipitate is washed thoroughly with a saturated solution of the salt and then dissolved in distilled water. The salt may be removed from the solution by dialysis or the active fraction can be precipitated out of the aqueous solution by the use of organic solvents or by other means such as those described in the above examples.

The products of this invention and of the above examples are characterized by their very pronounced effect of reducing gastric secretion and acidity. Heating, for example, under the conditions mentioned above for destruction of any fraction having anterior pituitary-like activity, does not destroy this property of the new products of reducing the amount of secretion and the acidity of gastric juice. Heating under the same conditions also does not destroy the property of being effective against ulcers.

The products of this invention may be administered to humans parenterally, preferably subcutaneously or intramuscularly, in accordance with the practice known to those familiar to this art.

The invention is not limited to use of the urines described in the examples as starting materials for obtaining the new active principles. Other urines of mammals, both pregnant and non-pregnant, may be used. However, I prefer the use of non-pregnant female urine or male urine as starting materials, since it is not necessary to separate out anterior pituitary-like hormones which may be present with the active fraction when it is obtained from pregnancy urine. I also prefer to use urine from subjects who are not suffering from gastric or duodenal or like ulcers, because I have found that urines from subjects thus suffering from ulcers usually contain little or none of the ulcer preventing factor.

In separating the active principles one is not limited to the use of the precipitants given in the examples. For instance, the method as described in Example 1 can be successfully carried out by forming other insoluble adsorbing agents in the urine than benzoic acid, such as stearic acid, cinnamic acid, naphthoic acid, adipic acid, etc. Various inorganic precipitates, such as molybdic or tungstic acid or phosphotungstic acid may be used to remove the activity from the main body of the urine source material. The active fraction can be removed from such acid substances, either by a solvent which dissolves the acid but does not dissolve the active fraction, for example as described above with benzoic acid, or by adding a basic substance to the acid which is capable of forming a salt of the acid less soluble than the acid itself, so that the acid can be removed from the solution while the active fraction remains.

The foregoing description of the invention shows that the new active principle can be obtained by any method which causes separation from mammalian urine of normally water-soluble constituents which are insoluble in organic solvents such as alcohol and acetone.

What I claim as my invention is:

A product effective against ulcers, which is derived from urine of mammals not suffering from a gastric or duodenal ulcer, having the following properties—not toxic to humans, showing no gonadotropic activity on immature female mice, reducing gastric secretion and acidity, having no estrogenic activity, useful for inhibiting and treating gastroenteric ulcers, being, in the dry state, an amorphous powder the aqueous solutions of which do not reduce Fehling's solution, soluble in water, insoluble in undiluted neutral organic solvents, and the aqueous solutions of which are not inactivated by moderate heating.

DAVID J. SANDWEISS.